United States Patent
Kuczynski et al.

(10) Patent No.: US 9,915,316 B2
(45) Date of Patent: Mar. 13, 2018

(54) PALLET DESIGN FOR VIBRATION MITIGATION

(71) Applicant: International Business Machines Corporation, Armonk, NY (US)

(72) Inventors: Joseph Kuczynski, North Port, FL (US); Kevin M. O'Connell, Rochester, MN (US); Chelsie M. Peterson, Dexter, MN (US); Mark D. Plucinski, Rochester, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/736,315

(22) Filed: Jun. 11, 2015

(65) Prior Publication Data
US 2016/0362224 A1 Dec. 15, 2016

(51) Int. Cl.
*F16F 15/00* (2006.01)
*F16F 9/43* (2006.01)
(Continued)

(52) U.S. Cl.
CPC ........ *F16F 15/002* (2013.01); *B65D 19/0012* (2013.01); *B65D 19/38* (2013.01);
(Continued)

(58) Field of Classification Search
CPC . B30B 15/061; F16F 9/003; F16F 9/30; F16F 9/0218; F16F 9/5123; F16F 5/00;
(Continued)

(56) References Cited

U.S. PATENT DOCUMENTS

| 2,417,347 | A | | 3/1947 | Brown |
| 3,145,853 | A | * | 8/1964 | Langenberg ............ B60P 7/065 410/125 |

(Continued)

FOREIGN PATENT DOCUMENTS

| CN | 103291796 B | 3/2015 |
| EP | 1048876 A3 | 2/2001 |

(Continued)

OTHER PUBLICATIONS

AB Pac, "ALL-in-the-Box packing Solution Provider," Vibration/Shock Mount, Pallet Cushion, 1 page, © Copyright AB Pac (S) Pte Ltd, http://www.abpac.net/prod.php?id=162.
(Continued)

*Primary Examiner* — Robert A. Siconolfi
*Assistant Examiner* — San Aung
(74) *Attorney, Agent, or Firm* — Jared C. Chaney

(57) ABSTRACT

A system for mitigating vibration of a mass may include an elastic membrane enclosing at least one interior space and having an outer surface, where at least a bottom portion of the outer surface is coupled to a transportable supportive surface, and at least a top portion of the outer surface supports a load. The system may further include at least one port coupling the outer surface to the at least one interior space, where the port provides a source of fluid ingress into the interior space and fluid egress out of the interior space. The system may additionally include granular material distributed within the at least one interior space, where a packing density of the granular material is adjustable between a first jammed state having a first packing density of granular materials and a second jammed state having a second packing density of granular materials to accommodate different loads.

16 Claims, 6 Drawing Sheets

(51) Int. Cl.

| | | |
|---|---|---|
| *F16F 9/512* | (2006.01) | |
| *B65D 19/38* | (2006.01) | |
| *F16F 15/027* | (2006.01) | |
| *F16F 7/01* | (2006.01) | |
| *B65D 19/00* | (2006.01) | |
| *F16F 13/10* | (2006.01) | |
| *F16F 13/26* | (2006.01) | |
| *F16F 15/02* | (2006.01) | |
| *B65D 81/02* | (2006.01) | |

(52) U.S. Cl.
CPC ............... *F16F 7/015* (2013.01); *F16F 9/43* (2013.01); *F16F 9/512* (2013.01); *F16F 13/10* (2013.01); *F16F 13/26* (2013.01); *F16F 15/022* (2013.01); *F16F 15/027* (2013.01); *B65D 81/02* (2013.01); *B65D 2519/0086* (2013.01); *B65D 2519/00268* (2013.01)

(58) Field of Classification Search
CPC ...... F16F 9/02; F16F 9/43; F16F 9/512; F16F 9/3295; F16F 13/10; F16F 13/26; F16F 7/015; F16F 15/002; F16F 15/022; F16F 15/027; A01K 27/005; A47C 27/081; A47C 27/087; A47C 7/46; A47C 7/467; B65D 81/02; B65D 19/38; B65D 19/0012; B65D 2519/0086; B65D 2519/00268
USPC .................................. 267/113, 75, 119, 130
See application file for complete search history.

(56) References Cited

U.S. PATENT DOCUMENTS

| | | | | |
|---|---|---|---|---|
| 3,554,135 A | * | 1/1971 | Duvall | B60P 7/065 206/522 |
| 3,748,669 A | * | 7/1973 | Warner | A47C 27/085 5/673 |
| 5,079,786 A | * | 1/1992 | Rojas | A47C 7/021 5/654 |
| 5,595,806 A | * | 1/1997 | Korfmacher | B65D 81/02 206/521 |
| 6,253,806 B1 | * | 7/2001 | Sperry | B60P 7/065 141/10 |
| 6,955,250 B2 | | 10/2005 | Kreider et al. | |
| 7,445,094 B1 | | 11/2008 | Henderson et al. | |
| 8,794,405 B2 | | 8/2014 | Yamashita et al. | |
| 8,882,165 B2 | | 11/2014 | Lipson et al. | |
| 2005/0116380 A1 | * | 6/2005 | Tadin | A43B 7/28 264/223 |
| 2010/0187022 A1 | * | 7/2010 | Saigh | B65D 19/38 177/132 |
| 2011/0290606 A1 | | 12/2011 | Weisbeck | |
| 2014/0086718 A1 | | 3/2014 | Bush | |
| 2014/0090581 A1 | | 4/2014 | Schultz | |
| 2014/0116300 A1 | * | 5/2014 | Brown | B65D 19/0026 108/51.11 |
| 2014/0290531 A1 | | 10/2014 | Jaeger et al. | |
| 2017/0067774 A1 | | 3/2017 | Gough et al. | |

FOREIGN PATENT DOCUMENTS

| | | |
|---|---|---|
| JP | 3177476 U | 8/2012 |
| KR | 1020090100485 A | 9/2009 |

OTHER PUBLICATIONS

Brown et al., "Universal robotic gripper based on the jamming of granular material," PNAS, Nov. 2, 2010, pp. 18809-18814, vol. 107, No. 44, www.pnas.org/cgi/doi/10.1073/pnas.1003250107.

Jaeger, "Celebrating Soft Matter's 10th Anniversary: Toward jamming by design," Royal Society of Chemistry, Soft Matter, 2014, 16 pages, © The Royal Society of Chemistry 2014, DOI: 10.1039/c4sm01923g, www.rsc.org/softmatter Sorbothane, "Sorbothane Shock Absorbing Floating Pallet," Sorbothane Inc., 2015, 3 pages, Copyright © 2015 Sorbothane, Inc., http://www.sorbothane.com/blog/sorbothane-shock-absorbing-floating-pallet/.

"Accelerated Examination Support Document," International Business Machines Corporation, IBM Docket No. ROC920150108US2, dated Sep. 25, 2016, 17 pages.

Kuczynski, et al., "Pallet Design for Vibration Mitigation," U.S. Appl. No. 15/334,351, filed Oct. 26, 2016, IBM Docket No. ROC920150108US2.

List of Patents or Patent Applications Treated as Related, dated Oct. 25, 2016, 2 pages.

AB Pac, "All-in-the-Box packing Solution Provider," Vibration/Shock Mount, Pallet Cushion, 1 page, ©Copyright AB Pac (S) Pte Ltd, http://www.abpac.net/prod.php?id=162.

Jaeger, "Celebrating Soft Matter's 10th Anniversary: Toward jamming by design," Royal Society of Chemistry, Soft Matter, 2014, 16 pages, © The Royal Society of Chemistry 2014, DOI: 10.1039/c4sm01923g, www.rsc.org/softmatter.

* cited by examiner

PALLET DESIGN FOR VIBRATION MITIGATION

BACKGROUND

The present disclosure relates to shipping and storage of a load, and more specifically, to using the packing density of granular particles encased in membrane to adjustably mitigate vibration in a load.

Consumer products, raw materials and other goods may be stored and transported on pallets. Pallets may be moved by forklifts, and transported on trains, trucks or ships. Vibrational energy from devices used to move, store and transport pallets may transfer vibrational energy to the pallets.

SUMMARY

According to embodiments of the present disclosure, a system for mitigating vibration of a mass may include an elastic membrane enclosing at least one interior space and having an outer surface, where at least a bottom portion of the outer surface is coupled to a transportable supportive surface, and at least a top portion of the outer surface supports a load. The system may further include at least one port coupling the outer surface to the at least one interior space, where the port provides a source of fluid ingress into the interior space and fluid egress out of the interior space. The system may additionally include granular material distributed within the at least one interior space, where a packing density of the granular material is adjustable between a first jammed state having a first packing density of granular materials and a second jammed state having a second packing density of granular materials to accommodate different loads.

Various embodiments are directed to a system for mitigating vibration of a mass. The system may include an elastic membrane enclosing at least one interior space and having an outer surface, where at least a bottom portion of the outer surface is coupled to a pallet, and at least a top portion of the outer surface supports a load. The system may further include at least one port coupling the outer surface to the at least one interior space, where the port provides a source of fluid ingress into the interior space and fluid egress out of the interior space. The system may additionally include granular material distributed within the at least one interior space. A pressure gauge may also be coupled to the at least one port. The pressure gauge may provide a metric corresponding with a packing density of the granular material, the metric being used to adjust the packing density of the granular material between a first jammed state having a first packing density of granular materials and a second jammed state having a second packing density of granular materials to accommodate different loads.

Embodiments are directed towards a method for mitigating vibrations in a load. The method may include providing an elastic membrane enclosing at least one interior space and having an outer surface, where at least a bottom portion of the outer surface is coupled to a transportable supportive surface, and at least a top portion of the outer surface. The method may further include distributing a granular material within the at least one interior space, where a packing density of the granular material is adjustable between a first jammed state having a first packing density of granular materials and a second jammed state having a second packing density of granular materials to accommodate different loads. The method may additionally include modulating a volume of fluid in the interior space to adjust a packing density of the granular material in the at least one interior space to accommodate the load.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
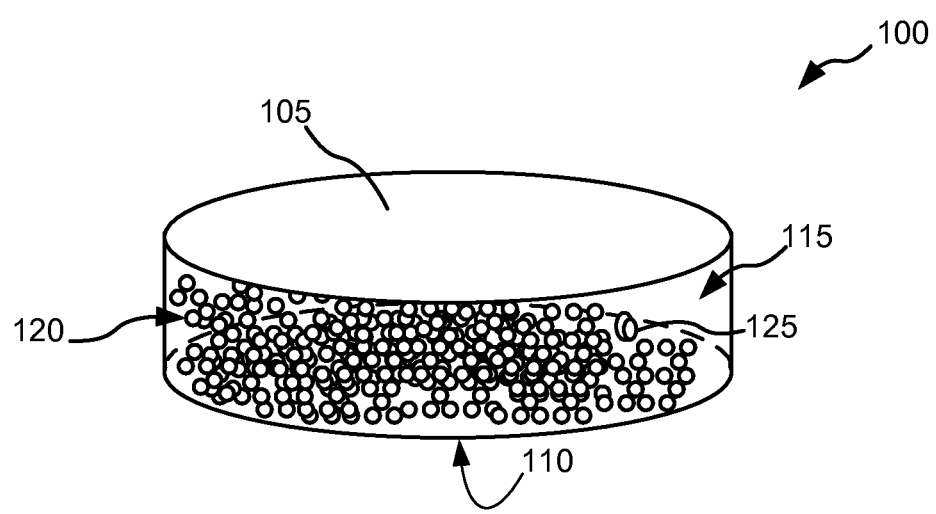
FIG. 1 depicts a diagram of a jammable puck, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to shipping and storage, more particular aspects relate to using the packing density of granular particles encased in membrane to adjustably mitigate vibration in a load. While the present disclosure is not necessarily limited to such applications, various aspects of the disclosure may be appreciated through a discussion of various examples using this context.

Vibrational energy may be transmitted from a pallet to a load, stored on the pallet, during shipment or storage. Some pallet designs manifest tradeoffs between energy transmission and weight carrying capability. Consider, for example, a first pallet and a second pallet, where the first pallet is designed to be stiffer than the second pallet. The second pallet may transfer less vibrational energy to a small load (e.g., resulting in less vibration of the load) than the second pallet. The first pallet, however, could have a greater weight carrying capability than the second pallet.

Embodiments of the present disclosure are based on the recognition that jammed particles can be used to mitigate the transmission of vibrational energy to a load by adapting the stiffness of a pallet to accommodate a given load. Jamming may include increasing or decreasing the rigidity of a volume by modulating the degree to which granular particles within the volume inhibit each other from rearranging. Granular particles in a volume under load may rearrange themselves to, for example, dissipate energy (e.g., vibrational energy) being transferred to the load. Various embodiments of the present disclosure are directed toward a system for mitigating vibration in a load using jammed particles. The system may include at least one jammable puck having an elastic membrane enclosing an interior space. The interior space may have volume of granular particles. An outer surface of the membrane of the jammable puck may include a bottom surface (e.g., a bottom portion) and a top surface (e.g., a top portion). The bottom surface may be attached to a planar transportable supportive surface (e.g., a pallet), while a load may be supported on a top surface. The system may selectively jam the granular particles (e.g., modulate the packing density of the granular particles) to vary the rigidity of the jammable puck, and thus the stiffness of the supportive surface relative to the load. The granular particles may be jammed by varying a volume of a fluid (e.g., air) in the space occupied by the volume of granular particles.

Referring now to the figures, FIG. 1 depicts a diagram of a jammable puck 100, according to various embodiments. The jammable puck 100 may include a membrane having a top portion 105, a bottom portion 110, an interior space 115, a volume of granular material 120, and a port 125.

According to some embodiments, the membrane may be elastic, and may be composed of such elastomeric materials as latex, thermoplastic polyurethane, or stretch fabric. The membrane may be a single contiguous piece of elastomeric material, or the membrane may be a composition of a plurality of materials including, for example, elastomeric, non-elastomeric (e.g., cloth), and composite (e.g., material having both elastomeric and non-elastomeric components) materials bonded or integrated together. In some embodiments, the membrane may have a three dimensional geometric shape (e.g., a square, sphere, or polyhedron) enclosing an interior space 115. In other embodiments, the membrane may be an amorphous three dimensional shape enclosing an interior space 115. In certain embodiments, the membrane may enclose a plurality of individual interior spaces. One or more caps or covers (not shown) may be attached to a portion of the membrane to allow materials (e.g., granular material 120) to be added or removed from the interior space. The caps may entirely seal the interior space 115 to prevent the granular material 120 from leaking out of the interior space.

The membrane material may be selected to be impermeable to the granular material 120, and a fluid (e.g. air) that may be used to modulate the packing density of the granular material. The membrane material may be impermeable to granular material 120 and the fluid in the interior space if neither the granular material nor the fluid can leak out of the interior space 115 when the membrane encloses the interior space. The material composition of the membrane may also be selected to enable the jammable puck 100 to support a given range of loads (e.g., loads having different masses and geometries) on the top portion 105. The membrane material, for example, may be selected to enable the jammable puck 100 to compress, deform, and/or expand to accommodate a range of selected loads without tearing, permanently deforming, or becoming permeable to the granular material 120 or the fluid distributed in the interior space.

In some embodiments, the membrane material may be selected or configured to limit the degree to which the jammable puck 100 may expand or stretch under a load. A selected elastomeric membrane material, for example, may have a property that a given length of the material will expand or increase up to 10% when stretched. In certain embodiments, the membrane of the jammable puck 100 (or the jammable puck itself) may be enclosed in a material (not shown) that may, for example, limit the degree of expansion of the membrane, or increase the durability of the jammable puck. The size or geometry of the jammable puck may be selected to provide a certain degree of vibration mitigation for a range of supported loads (e.g., the size or geometry of the jammable puck may correspond with the size or geometry of loads that may be supported by the jammable puck).

In some embodiments, the interior space 115 may be at least partially filled with the granular material 120 and a fluid (not shown). In embodiments where the jammable puck includes a plurality of internal spaces 115, at least one of the plurality of interior space may be at least partially filled with the granular material 120 and/or a fluid. The volume of the granular material 120 disposed in the interior space 115 may be selected to meet given design requirements such as a packing density (e.g., amount of granular material per unit volume of the interior space) or a certain distribution of granular material over a range of jammed states. Stated another way, the volume of granular material may be selected to enable the jammable puck to provide a certain amount of vibration mitigation to a given range of supported loads. When, for example, the interior space is completely filled with granular particles, the jammable puck may be adjustable to accommodate only a narrow range because there is little potential for jamming. Partially filling the interior space, on the other hand, may enable the jammable puck to be adjusted to accommodate a wider range of loads due to the greater potential for jamming.

The granular material 120 may include small macroparticles such as sand, coffee grounds, metallic or rubber grains, and/or plastic granules. In some embodiments, the granular material 120 may include free flowing macroparticles that can be redistributed in the interior space 115 by changing the volume of fluid in the interior space 115.

At least one port 125 may function as a source of fluid ingress into and egress out of the interior space 115. The port 125 may be configured to engage a fluid pump (e.g., an air pump or compressor). The port 125 may have a sealable opening for enabling a volume of fluid to traverse the port. In some embodiments, the opening in the port 125 may be self-sealable, preventing fluid from traversing the port when the port is not engaged by, for example, a nozzle of a fluid pump. In some embodiments, the port 125 may be selected to have an opening that is not permeable to the granular material (e.g., the granular material cannot traverse the opening in the port 125).

The bottom portion 110 may be at least a first portion of a bottom surface of the membrane of the jammable puck 100. In some embodiments, the bottom portion 110 may include an attachment mechanism (not shown) to enable the bottom portion to be secured to a supportive surface. In other embodiments, the bottom portion 110 may be a portion of the membrane against which a supportive surface exerts an upward directed normal force when the jammable puck 100 is being supported by (e.g., situated on top of) the supportive surface.

The top portion 105 may be at least a second portion of a top surface of the membrane of the jammable puck 100. In some embodiments, the top portion 105 may include an attachment mechanism to enable the top portion to be secured to a load. In other embodiments, the top portion 105 may be a portion of the membrane against which a load exerts a downward directed normal force when the load is supported by the jammable puck.

Figure 2A:
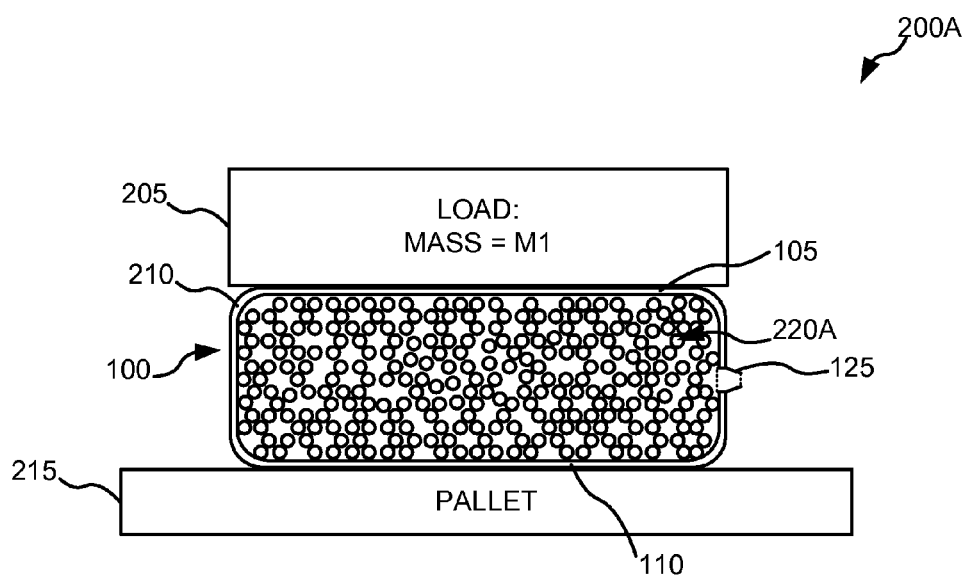
FIG. 2A depicts a cross sectional diagram of a system for mitigating vibration of a load having a mass, according to various embodiments.

FIG. 2A depicts a cross sectional diagram of a system 200A for mitigating vibration of a load 205 having a mass M1, according to various embodiments. The system 200A may include jammable puck 100 having a membrane 210, and transportable supportive surface 215.

The transportable supportive surface 215 may be any movable planar surface that can support the load 205 through one or more jammable pucks 100. In certain embodiments, the transportable supportive surface 215 may be a pallet. The jammable puck 100 may be secured (e.g., kept in contact and prevented from slipping) at a bottom portion 110 of the membrane 210 on top of supportive surface 215 by a locking or coupling device (e.g., an adhesive such as glue, hook and loop fasteners sold under the trademark Velcro, or a latch). The jammable puck 100 may also be secured to the top surface of supportive surface 215 by a frictional force.

The load 205 may be a load (e.g., goods, or raw materials) having a mass M1. In some embodiments, the jammable puck 100 may be configured to support a range of masses (e.g., 100 kilograms to 1000 kilograms). The jammable puck 100 may be secured to the load 205 at a top portion 105 of the membrane 210 by a locking or coupling mechanism. The jammable puck 100 may also be secured to the top surface of supportive surface 215 by a frictional force.

FIG. 2A serves to illustrate that jammable puck 100 may be adjusted or configured to accommodate a first load 205 having a first mass M1. Accommodating a load may include providing a given amount of vibration mitigation to the load during, for example, storage and transport. The jammable puck 100 may be adjusted to accommodate the first load 205 by modulating the volume of fluid inside the membrane 210 to achieve a first packing density or distribution of granular particles 220A. The first packing density or distribution of granular particles 220A may be determined according to the characteristics (e.g., including mass, and/or geometry) of the first load 105 and a desired degree of vibration mitigation.

Figure 2B:
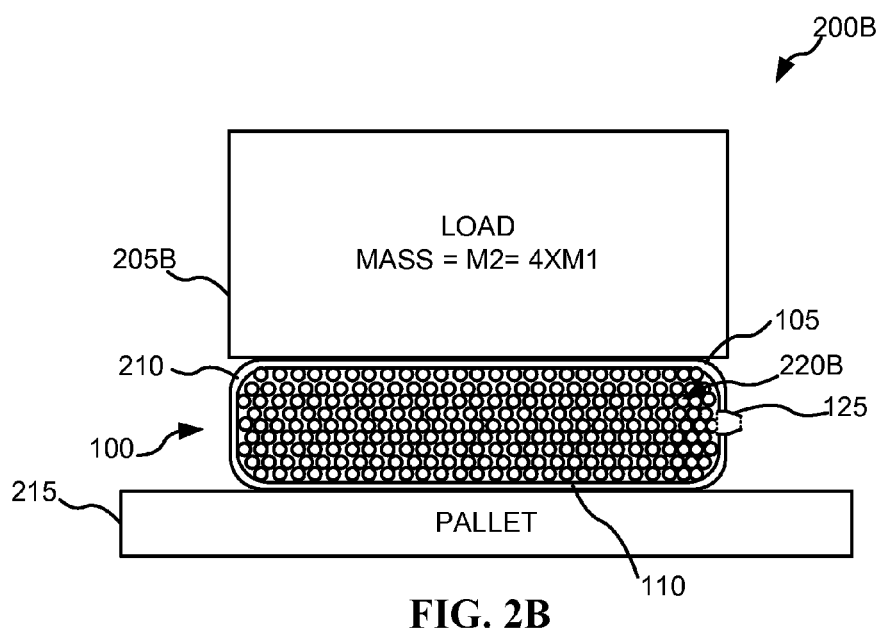
FIG. 2B depicts a second cross sectional diagram of a system for mitigating vibration of a second load having a second mass, according to various embodiments.

FIG. 2B depicts a second cross sectional diagram of a system for mitigating vibration of a second load 205B having a second mass M2, according to various embodiments. The system 200B may include jammable puck 100 having membrane 210, and transportable supportive surface 215.

FIG. 2B serves to illustrate that jammable puck 100 may be adjusted or configured to accommodate a second load 205B having a second mass M2. In some embodiments, the mass M2 may be four times the magnitude of the mass M1. The jammable puck 100 may be adjusted to accommodate the second load by changing the volume of fluid inside the membrane 210 to achieve a second packing density or distribution of granular particles 220B. The second packing density or distribution of granular particles 220B may be numerically larger (e.g., granular particles may be more closely packed) than the first packing density or distribution of granular particles 220A. The jammable puck 100 shown in FIG. 2B may include the same number of granular particles as the number of granular particles in the jammable puck shown in FIG. 2A.

Figure 3:
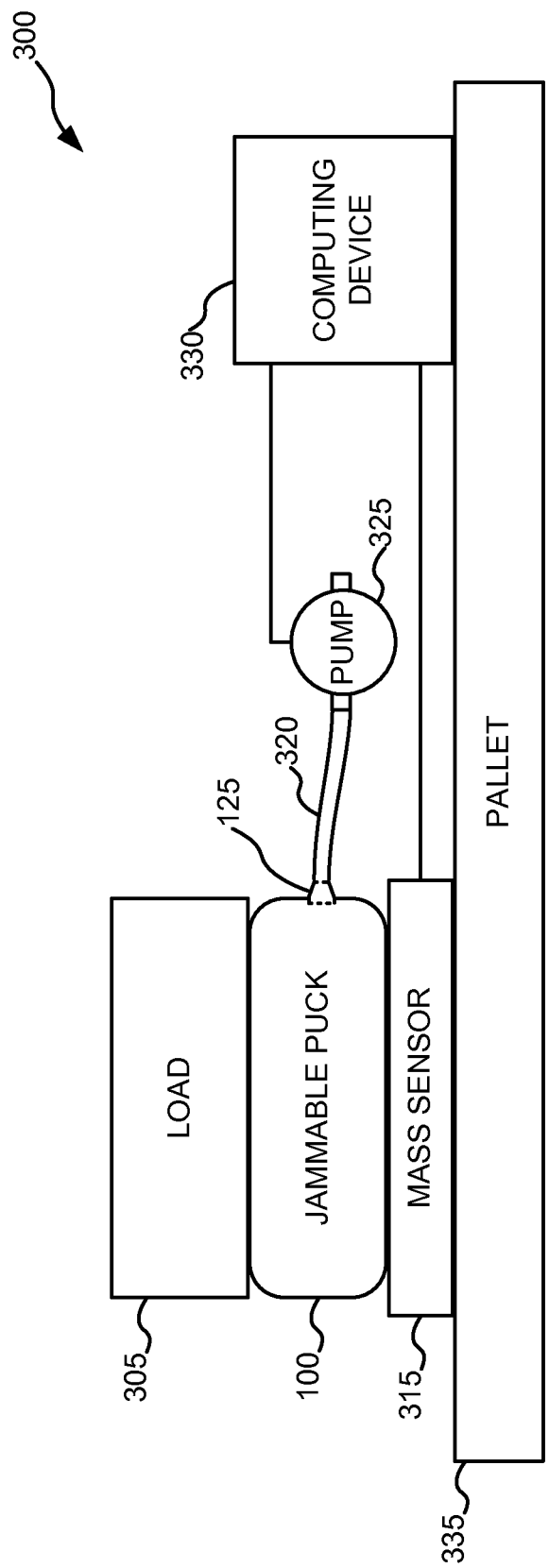
FIG. 3 depicts a block diagram of a system for mitigating vibration of a load, according to various embodiments.

FIG. 3 depicts a block diagram of a system 300 for mitigating vibration of a load 305, according to various embodiments. The system 300 may include a jammable puck 100, a mass sensor 315, a fluid pump 325 having fluid hose 320, computing device 330, and a transportable supportive surface 335. The transportable supportive surface 335 may be any moveable supportive surface (e.g., a pallet).

The mass sensor 315 may be a mechanical, electrical, or electromechanical device configured to determine the mass of a load 305. The mass sensor 315 may be configured to measure an actual mass (e.g., the physical amount of a load), or a relative mass (e.g., the mass of a load as seen by an object on which the load exerts a normal force). A relative mass may include an apparent increase in the mass of a load due to forces external to the load acting on the load. In some embodiments, the mass sensor 315 may be a scale, and/or a force sensor (e.g., an accelerometer). The mass sensor 315 may generate an output (e.g., a mass measurement) that can be interpreted by a user. The mass sensor 315 may also generate an electronic output to be received and interpreted by an electronic device, such as computing device 330. Although FIG. 3 depicts mass sensor 315 coupled between transportable supportive surface 335 and jammable puck 100, the mass sensor may be positioned anywhere that enables the mass sensor to determine the mass of the load 305. In some embodiments, for example, mass sensor may be coupled between load 305 and jammable puck 100.

The pump 325 may be mechanical, electrical, or electromechanical fluid pump configured to transport a volume of fluid into and out of jammable puck 100. In some embodiments, pump 325 may be an air pump. The hose 320 may be a fluid hose having a nozzle configured to couple, in a sealable fashion (e.g., the coupling is impermeable to the fluid being conducted through the hose 320), to port 125. In some embodiments, the pump 325 or hose 320 may include a fluid sensor (e.g., a pressure gauge) for determining the amount of fluid an interior space of jammable puck 100. The fluid sensor may provide a metric (e.g., a numerical measure or reading) corresponding with a packing density of granular material inside the jammable puck 100. The metric may be a measure of the volume of fluid inside the jammable puck 100.

In some embodiments, the pump 325 may have a control port (e.g., an electronic input port) to receive a control signal. The control signal may regulate the amount of fluid that the pump 325 transports into and out of jammable puck 100. For example, the control signal may enable the pump 325 to add a volume of fluid to an interior space of jammable puck 100 before the mass of load 305 is placed on the jammable puck. The amount of fluid added or removed can be determined from an output of the fluid sensor indicating the amount of fluid currently inside the jammable puck 100. The control signal may also regulate the timing of when the pump 325 transports a volume of fluid into or out of an interior space of jammable puck 100. For example, the control signal may activate the pump to change the volume of air in an interior space of the jammable puck whenever there is a change in the mass (actual or relative) of load 305.

Computing device 330 may be any electronic device capable of providing a control signal to pump 325 in response to receiving an output of the mass sensor 315. In some embodiments computing device 330 may be a computer such as the computing device 600 in FIG. 6. In certain embodiments the computing device 330 can be separate from the transportable supportive surface 335, with computing device receiving an output from the mass sensor 315, and providing a control signal to pump 325 via a wireless communication (e.g., via RFID). The computing device 330 may include a software application, firmware application, or script (herein after monitor program) to monitor an output received from the mass sensor 315 and generate, in response to the received output, a control signal for driving pump 325. In some embodiments, the computing device 330 may continually monitor the output of the mass sensor 315, and automatically generate a control signal for driving pump 325. The computing device 330 may, for example, continuously monitor the output of mass sensor 315 while system 300 is being used to transport the load 305. The computing device 330 may then modulate the control signal to the pump 325 whenever the mass sensor detects a change in the mass of load 305 due to, for example, a vibration or acceleration of the system 300.

In some embodiments, mass sensor 315, pump 325 (including hose 320), and computing device 330 may be stored and/or transported with jammable puck 100 and supportive load 335 as a system. In various embodiments, mass sensor 315, pump 325 and computing device 330 may be used to set the packing density of the granular particles in jammable puck 100 to accommodate a given load 305. The load 305 supported by jammable puck 100 and supportive surface 335 may then be stored or transported without mass sensor 315, pump 325, or computing device 330. In certain embodiments, the packing density of the granular particles in jammable puck 100 may set by manual operation of the pump 325.

Figure 4:
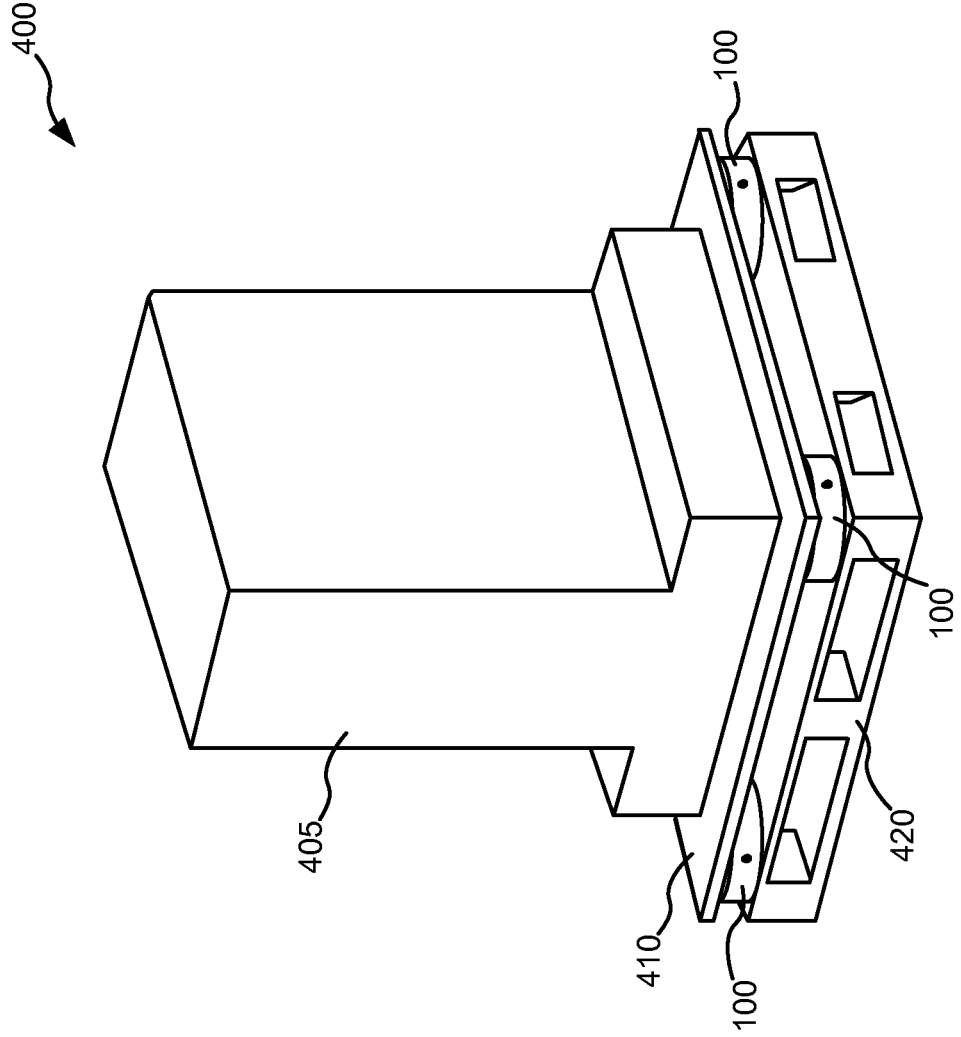
FIG. 4 depicts a block diagram of an embodiment of a system for mitigating vibration in a load, according to various embodiments.

FIG. 4 depicts a block diagram of an embodiment of a system 400 for mitigating vibration in a load 405, according to various embodiments. The system 400 may include interface surface 410, jammable pucks 100, and pallet 420 (e.g., a transportable supportive surface). The system 400 supports the load 405 using four jammable pucks 100 coupled to pallet 420. When a one or more of jammable pucks 100 are used to support a load 405, an interface surface 410 can be coupled between the load and the jammable pucks to distribute the mass of the load amongst the jammable pucks. In some embodiments, the interface surface 410 may be a planar transportable surface having dimensions and material properties (e.g., rigidity, and/or strength) enabling it to support the load 405. The four jammable pucks 100 may be configured to mitigate vibrations in the load 405 before and/or during the storage and/or transportation of the load, as described herein.

Figure 5:
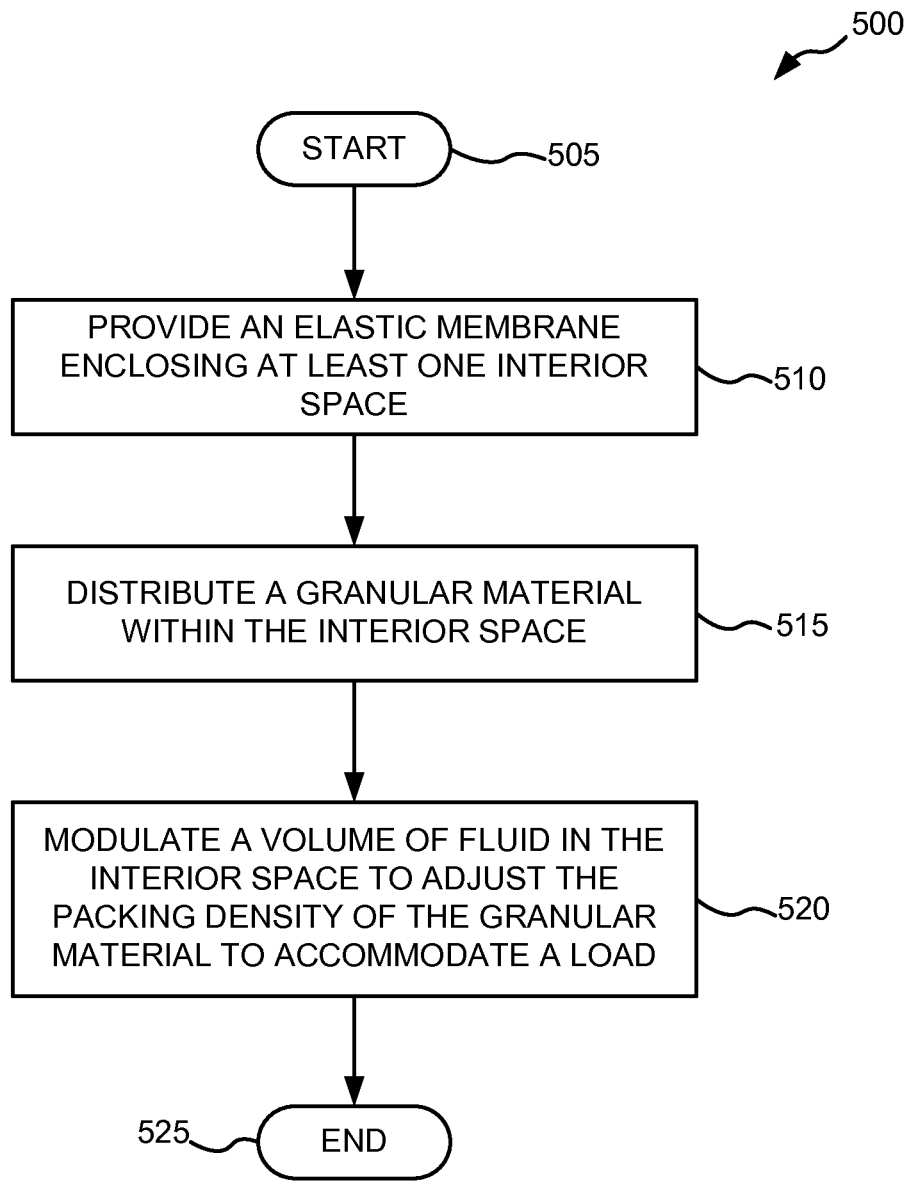
FIG. 5 depicts a flow chart of operations for mitigating vibration in a load, according to various embodiments.

FIG. 5 depicts a flow chart 500 of operations for mitigating vibration in a load, according to various embodiments. The operations may begin at block 505 by determining a set of characteristics of the load including, for example, the dimensions, weight, and/or an amount of vibration that can be tolerated by the load.

At least one elastic membrane enclosing at least one interior space may be provided, as indicated in a block 510. The elastic membrane may be selected, for example, with consideration to the characteristics of the load, and the storage or transportation environment as described in association with FIGS. 1 and 3.

A volume of granular material may be distributed within an interior space of the elastic membrane, as indicated in block 515. The volume of granular material (e.g., type of material, and quantity) may be selected and distributed within the interior space of the membrane, for example, as described in association with FIGS. 1 and 3.

A volume of fluid in the interior space may then be modulated by a computer to adjust a packing density of the granular material to accommodate a load, as indicated in block 520. Modulating the volume of fluid may include determining the mass of the load based on a signal received from a mass sensor. Modulating the volume of fluid may also include calculating an amount of fluid to add to or remove from the interior space. Furthermore, modulating the volume of fluid may include sending a signal to a fluid pump to adding a volume of fluid to or removing a volume of fluid from the interior space, as described in FIGS. 1-3. The flow chart may end at block 525.

Figure 6:
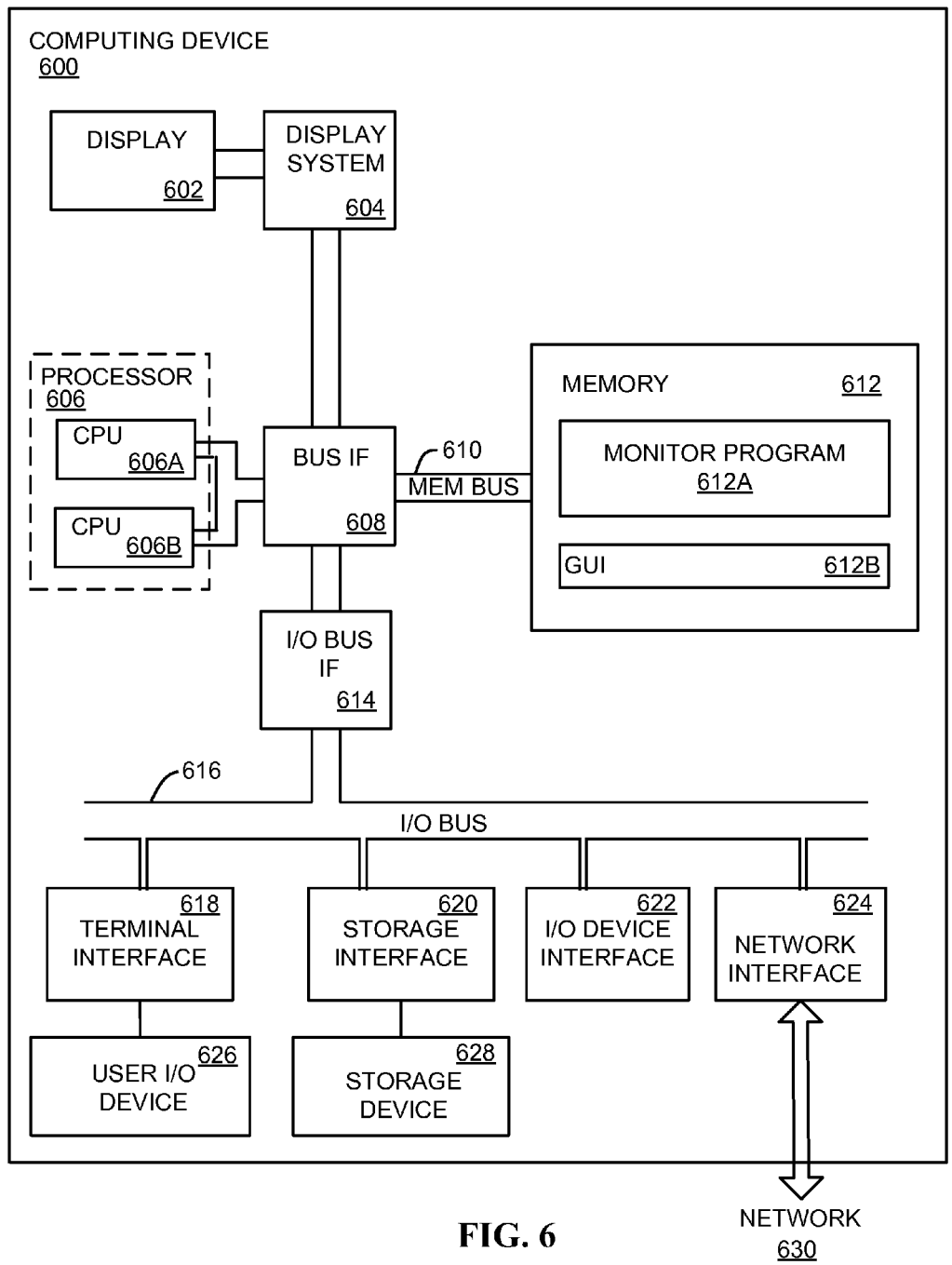
FIG. 6 is a block diagram illustrating an embodiment of a computing device that includes a memory and processor for automatically adjusting the packing density of a jammable puck, according to various embodiments.

FIG. 6 is a block diagram illustrating an embodiment of a computing device that includes a memory and processor for implementing and executing a circuit design system for correcting early mode slack fails in electronic circuits, according to various embodiments. The components of the computing device 600 can include one or more processors 606, a memory 612, a terminal interface 618, a storage interface 620, an Input/Output ("I/O") device interface 622, and a network interface 624, all of which are communicatively coupled, directly or indirectly, for inter-component communication via a memory bus 610, an I/O bus 616, bus interface unit ("IF") 608, and an I/O bus interface unit 614.

The computing device 600 may include one or more general-purpose programmable central processing units (CPUs) 606A and 606B, herein generically referred to as the processor 606. In certain embodiments, a processor may be any electronic device having a datapath for executing a sequence of programmed instructions and capable of performing arithmetic logic computations (e.g., using an arithmetic logic unit), include application specific integrated circuits, and field programmable gate arrays. In an embodiment, the computing device 600 may contain multiple processors; however, in another embodiment, the computing device 600 may alternatively be a single CPU device. Each processor 606 executes instructions stored in the memory 612.

The computing device 600 may include a bus interface unit 608 to handle communications among the processor 606, the memory 612, the display system 604, and the I/O bus interface unit 614. The I/O bus interface unit 614 may be coupled with the I/O bus 616 for transferring data to and from the various I/O units. The I/O bus interface unit 614 may communicate with multiple I/O interface units 618, 620, 622, and 624, which are also known as I/O processors (IOPs) or I/O adapters (IOAs), through the I/O bus 616. The display system 604 may include a display controller, a display memory, or both. The display controller may provide video, audio, or both types of data to a display device 602. The display memory may be a dedicated memory for buffering video data. The display system 604 may be coupled with a display device 602, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 604 may be on board an integrated circuit that also includes the processor 606. In addition, one or more of the functions provided by the bus interface unit 608 may be on board an integrated circuit that also includes the processor 606.

The I/O interface units support communication with a variety of storage and I/O devices. For example, the terminal interface unit 618 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 626 and the computing device 600, may receive output data via the user output devices. For example, a user interface may be presented via the user I/O device 626, such as displayed on a display device, played via a speaker, or printed via a printer.

The storage interface 620 supports the attachment of one or more disk drives or direct access storage devices 628 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 628 may be implemented via any type of secondary storage device. The contents of the memory 612, or any portion thereof, may be stored to and retrieved from the storage device 628 as needed. The I/O device interface 622 provides an interface to any of various other I/O devices or devices of other types, such as printers or fax machines. The network interface 624 provides one or more communication paths from the computing device 600 to other digital devices and computer systems.

Although the computing device 600 shown in FIG. 6 illustrates a particular bus structure providing a direct communication path among the processors 606, the memory 612, the bus interface 608, the display system 604, and the I/O bus interface unit 614, in alternative embodiments the computing device 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 614 and the I/O bus 608 are shown as single respective units, the computing device 600, may include multiple I/O bus interface units 614 and/or multiple I/O buses 616. While multiple I/O interface units are shown, which separate the I/O bus 616 from various communication paths running to the various I/O devices, in other embodiments, some or all of the I/O devices are connected directly to one or more system I/O buses.

In various embodiments, the computing device 600 is a multi-user mainframe computer system, a single-user system, or a server computer or similar device that has little or no direct user interface, but receives requests from other computer systems (clients). In other embodiments, the computing device 600 may be implemented as a desktop computer, portable computer, laptop or notebook computer, tablet computer, pocket computer, telephone, smart phone, or any other suitable type of electronic device.

In an embodiment, the memory 612 may include a random-access semiconductor memory, storage device, or storage medium (either volatile or non-volatile) for storing or encoding data and programs. In another embodiment, the memory 612 represents the entire virtual memory of the computing device 600, and may also include the virtual memory of other computer systems coupled to the computing device 600 or connected via a network 630. The memory 612 may be a single monolithic entity, but in other embodiments the memory 612 may include a hierarchy of caches and other memory devices. For example, memory may exist in multiple levels of caches, and these caches may be further divided by function, so that one cache holds instructions while another holds non-instruction data, which is used by the processor. Memory 612 may be further distributed and associated with different CPUs or sets of CPUs, as is known in any various so-called non-uniform memory access (NUMA) computer architectures.

The memory 612 may store all or a portion of the components and data shown in FIGS. 1-5. In particular, the memory 612 may store a monitor program 612A configured to continuously monitor, for example, the mass of the load 305 and modulate the packing density of the jammable puck 100. The memory 612 may also include a graphical user interface (GUI) 612B for displaying an output of the mass sensor 315 and/or configuring the parameters of the system 300. These programs and data structures are illustrated in FIGS. 1-5 as being included within the memory 612 in the computing device 600; however, in other embodiments, some or all of them may be on different computer systems and may be accessed remotely, e.g., via a network 630. The computing device 600 may use virtual addressing mechanisms that allow the programs of the computing device 600 to behave as if they only have access to a large, single storage entity instead of access to multiple, smaller storage entities. Thus, while the components and data shown in FIGS. 1-5 are illustrated as being included within the memory 612, these components and data are not necessarily all completely contained in the same storage device at the same time. Although the components and data shown in FIGS. 1-5 are illustrated as being separate entities, in other embodiments some of them, portions of some of them, or all of them may be packaged together.

In an embodiment, the components and data shown in FIGS. 1-5 may include instructions or statements that execute on the processor 606 or instructions or statements that are interpreted by instructions or statements that execute the processor 606 to carry out the functions as further described below. In another embodiment, the components shown in FIGS. 1-5 may be implemented in hardware via semiconductor devices, chips, logical gates, circuits, circuit cards, and/or other physical hardware devices in lieu of, or in addition to, a processor-based system. In an embodiment, the components shown in FIGS. 1-5 may include data in addition to instructions or statements.

FIG. 6 is intended to depict representative components of the computing device 600. Individual components, however, may have greater complexity than represented in FIG. 6. In FIG. 6, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 6 may be implemented, in various embodiments, in a number of different ways, including using various computer applications, routines, components, programs, objects, modules, data structures etc., which may be referred to herein as "software," "computer programs," or simply "programs."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for mitigating vibration of a load, comprising:
an elastic membrane enclosing at least one interior space and having an outer surface, wherein at least a bottom portion of the outer surface is coupled to a transportable supportive surface and at least a top portion of the outer surface supports the load;

at least one port coupling the outer surface to the at least one interior space,
wherein the at least one port provides a source of fluid ingress into the interior space and a source of fluid egress out of the interior space;

a granular material distributed within the at least one interior space,
wherein a packing density of the granular material is adjustable between a first jammed state having a first packing density of granular materials and a second jammed state having a second packing density of granular materials to accommodate different loads;

a pump having a nozzle coupled to the at least one port;

a mass sensing device having a sensing surface for sensing a mass of the load,
wherein the mass sensing device senses the mass of the load based on a weight of the load asserted on the mass sensing device; and a computing device to receive an input from the mass sensing device and to drive a control input of the pump to regulate, in response to receiving the input from the mass sensing device, a quantity of fluid in the interior space to adjust the packing density of the granular material between the first jammed state and the second jammed state.

2. The system of claim 1, wherein the first packing density is numerically larger than the second packing density when the system in the first jammed state is configured to accommodate a larger load than the system in the second jammed state.

3. The system of claim 2, wherein a first quantity of fluid in the interior space in the first jammed state is less than a second quantity of fluid in the interior space in the second jammed state.

4. The system of claim 1,
wherein the computing device continually regulates, in response to receiving the input from the mass sensing device and in response to a change in a relative mass of the load during storage or transport, the quantity of fluid in the interior space to modulate the packing density between the first jammed state and the second jammed state.

5. The system of claim 1, wherein the transportable supportive surface is a pallet.

6. The system of claim 1, wherein the fluid is air.

7. A system for mitigating vibration of a load, comprising:
an elastic membrane enclosing at least one interior space and having an outer surface,
wherein at least a bottom portion of the outer surface is coupled to a pallet and at least a top portion of the outer surface supports the load, the size of the elastic membrane expandable and compressible to support the load;

at least one port coupling the outer surface to the at least one interior space,
wherein the at least one port provides a source of fluid ingress into the interior space and fluid egress out of the interior space;

a pressure gauge coupled to the at least one port;

a granular material distributed within the at least one interior space,
wherein the pressure gauge provides a metric corresponding with a packing density of the granular material, the metric being used to adjust the packing density of the granular material between a first jammed state having a first packing density of granular materials and a second jammed state having a second packing density of granular materials to accommodate different loads;

a pump having a nozzle coupled to the at least one port;

a mass sensing device having a sensing surface for determining a mass of the load,
wherein the mass sensing device determines the mass of the load based on a weight of the load asserted on the mass sensing device; and a computing device to receive an input from both the mass sensing device and the pressure gauge to drive a control input of the pump to regulate, in response to the input, an amount of fluid in the interior space to further adjust the packing density between the first jammed state and the second jammed state.

8. The system of claim 7, wherein the first packing density is numerically larger than the second packing density when the system in the first jammed state is configured to accommodate a larger load than the system in the second jammed state.

9. The system of claim 8, wherein a first amount of fluid in the interior space in the first jammed state is less than a second amount of fluid in the interior space in the second jammed state.

10. The system of claim 7,
wherein the computing device continually regulates, in response to receiving the input from the mass sensing device and in response to a change in a relative mass of the load, the amount of fluid in the interior space to modulate the packing density between the first jammed state and the second jammed state.

11. The system of claim 7, wherein the fluid is air.

12. A method for mitigating vibration of a mass, comprising:
providing an elastic membrane enclosing at least one interior space and having an outer surface,
wherein at least a bottom portion of the outer surface is coupled to a transportable supportive surface, and at least a top portion of the outer surface supports a load;

coupling at least one port to the outer surface and to the at least one interior space,
wherein the at least one port provides a source of fluid ingress into the interior space and fluid egress out of the interior space;

distributing a granular material within the at least one interior space,
wherein a packing density of the granular material is adjustable between a first jammed state having a first packing density of granular materials and a second jammed state having a second packing density of granular materials to accommodate different loads;

providing a pump having a nozzle coupled to the at least one port;

providing a mass sensing device having a sensing surface to sense a mass of the load,
wherein the mass sensing device senses the mass of the load based on a weight of the load asserted on the mass sensing device; and providing a computing device to receive an input from the mass sensing device and to drive a control input of the pump to regulate, in response to receiving the input from the mass sensing device, a quantity of fluid in the interior space to modulate the packing density of the granular material between the first jammed state and the second jammed state.

13. The method of claim 12, wherein the first packing density is numerically larger than the second packing density when the granular material in the first packing state is configured to accommodate a larger load than the granular material in the second jammed state.

14. The method of claim 13, wherein a first amount of fluid in the interior space in the first jammed state is less than a second amount of fluid in the interior space in the second jammed state.

15. The method of claim 13,
wherein the computing device continually regulates, in response to receiving the input from the mass sensing device and in response to a change in a relative mass of the load, the quantity of fluid in the interior space to modulate the packing density between the first jammed state and the second jammed state.

16. The method of claim 12, wherein the transportable supportive surface is a pallet.

\* \* \* \* \*